United States Patent
Bessiere et al.

(10) Patent No.: US 12,459,842 B2
(45) Date of Patent: Nov. 4, 2025

(54) METHOD FOR PRODUCING MICROBIAL CELLULAR BIOMASS HAVING FLOCCULANT PROPERTIES

(71) Applicants: Institut National des Sciences Appliquées de Toulouse, Toulouse (FR); Centre National de la Recherche Scientifique, Paris (FR); Institut national de recherche pour l'agriculture, l'alimentation et l'environnement, Paris (FR)

(72) Inventors: Yolaine Bessiere, Toulouse (FR); Etienne Paul, Toulouse (FR); Jean-Noel Louvet, Toulouse (FR); Elise Blanchet, Toulouse (FR); Evrard Mengelle, Toulouse (FR); Simon Dubos, Toulouse (FR); Mansour Bounouba, Toulouse (FR); Carine Saux, Toulouse (FR); Ana Morgado Ferreira, Toulouse (FR); Dores Cirne, Saint-Maurice (FR)

(73) Assignees: INSTITUT NATIONAL DES SCIENCES APPLIQUÉES DE TOULOUSE, Toulouse (FR); CENTRE NATIONAL DE LA RECHERCHE SCIENTIFIQUE, Paris (FR); INSTITUT NATIONAL DE RECHERCHE POUR L'AGRICULTURE, L'ALIMENTATION ET L'ENVIRONNEMENT, Paris (FR)

(*) Notice: Subject to any disclaimer, the term of this patent is extended or adjusted under 35 U.S.C. 154(b) by 1044 days.

(21) Appl. No.: 17/434,794

(22) PCT Filed: Mar. 10, 2020

(86) PCT No.: PCT/FR2020/050489
§ 371 (c)(1),
(2) Date: Mar. 23, 2022

(87) PCT Pub. No.: WO2020/183103
PCT Pub. Date: Sep. 17, 2020

(65) Prior Publication Data
US 2022/0242759 A1 Aug. 4, 2022

(30) Foreign Application Priority Data
Mar. 11, 2019 (FR) ..................... 1902451

(51) Int. Cl.
*C02F 1/32* (2023.01)
*C02F 1/52* (2023.01)
(Continued)

(52) U.S. Cl.
CPC ............. *C02F 1/5263* (2013.01); *C02F 3/34* (2013.01); *C12N 1/20* (2013.01); *C12P 19/04* (2013.01); *C02F 2305/06* (2013.01)

(58) Field of Classification Search
CPC .......... C02F 1/52; C02F 3/34; C02F 2103/32; C02F 2203/006; C02F 2209/03;
(Continued)

(56) References Cited

U.S. PATENT DOCUMENTS

2015/0275234 A1* 10/2015 Ketola ................... C12P 5/023
                                                                  435/287.5
2019/0276858 A1*  9/2019 Pradella .................... C12P 7/04

FOREIGN PATENT DOCUMENTS

CN     106085923 A  * 11/2016  ............... C02F 1/52
CN     107954552 A  *  4/2018

OTHER PUBLICATIONS

CN-106085923-A Translation (Year: 2016).*
CN-107954552-A Translation (Year: 2017).*
Faouzi Ben Rebah, "Microbial Flocculants as an Alternative to Synthetic Polymers for Wastewater Treatment: A Review", Symmetry 2018, 10, 556.
International Search Report for corresponding application PCT/FR2020/050489 filed Mar. 10, 2020; Mail date Jul. 17, 2020.
(Continued)

*Primary Examiner* — Allison G Fitzsimmons
(74) *Attorney, Agent, or Firm* — CANTOR COLBURN LLP

(57) ABSTRACT

The disclosure relates to a microbial cellular biomass having flocculant properties, to its obtaining process and to its use in the treatment by flocculation.

17 Claims, 3 Drawing Sheets

(51) Int. Cl.
 *C02F 3/34* (2023.01)
 *C12N 1/20* (2006.01)
 *C12P 19/04* (2006.01)

(58) Field of Classification Search
 CPC .............. C02F 2209/06; C02F 2303/12; C02F 2303/14; C02F 2305/06; C02F 3/2866; C12N 1/20; C12P 19/04; C12P 23/00; C12P 5/023; C12M 21/04; C12M 23/58; C12M 41/30; C12M 45/00; Y02E 50/30; B01D 19/02; B01D 19/00; B01D 19/0006; B01D 19/06; B01J 13/00; B01J 13/0086; B01J 8/00; B01J 8/0095; B01J 8/18
 See application file for complete search history.

(56) References Cited

OTHER PUBLICATIONS

Jungyuan Guo, "Enhanced efficiencies of sludge dewatering and domestic wastewater treatment by using the bioflocculant from rice stover", Water and Evironment Journal, 31, (2017) 120-126.

Li Wang, "Bioflocculants from hydrolysates of corn stover using isolated strain Ochrobactrium ciceri W2", Bioresource Technology 145 (2013) 259-263.

Poonsuk Prasertsan, "Optimization for biopolymer production by Enterobacter cloacae WD7", Science Direct, Carbohydrate Polyners 71, (2008) 468-475.

Siqing Xia, "Production and Characterization of a bioflocculant by Proteus mirabilis TJ-1", Biosource Technology 99 (2008) 6520-6527.

T.T. More, "Extracellular polymeric substances of bacteria and their potential environmentsl applications", Journal of Environmental Management, 144 (2016), 1-25.

\* cited by examiner

METHOD FOR PRODUCING MICROBIAL CELLULAR BIOMASS HAVING FLOCCULANT PROPERTIES

TECHNICAL FIELD

The disclosure relates to a microbial cellular biomass having flocculant properties, to its obtaining process and to its use in the treatment by flocculation of an aqueous and/or oily solution or suspension.

BACKGROUND

Drinking water and wastewater treatment processes generally include one or more steps to removes suspended matters and colloidal matters (the so-called clarification step). Most of these clarification processes combine coagulation, flocculation and settling requiring both a primary coagulant, often inorganic salts, such as $FeCl_3$, and a flocculant adjuvant, a polymer, the most used being anionic polyacrylamide (PAM). It is estimated that 1.2 to 7.2 kilotons of $FeCl_3$ are thus use each year in a water treatment plant treating an organic load corresponding to 1 million of population equivalent, which represents a non-negligible cost.

In addition to the cost associated with these treatments, water treatment plants (STEP) are dependent of a supply of chemical products whose production and transport have an impact on the environment. The production and the use of products manufactured within the water treatment plant itself according to a principle of circular economy with short supply chain, thus minimizing the environmental impacts and improving the environmental balance of the STEP would be an important evolution. In general, any reduction in the consumption of reagents especially $FeCl_3$ would significantly improve the environmental balance of a STEP. Moreover, the synthesis of chemicals products requires in most cases, a lot of products and materials, and generates a lot of pollutants as well as wastewater that also requires treatment.

One notes, moreover, that certain flocculants of the synthetic polymer type may persist in the environment and some of their by-products may prove to be dangerous. The particular case of polyacrylamide (PAM) is representative because this polymer may degrade into acrylamide classified by the International Agency for Research on Cancer (CIRC) as a probable group 2A carcinogen (Yuliani E., Imai T., Teeka J., Tomita S., Suprayogi Exopolysaccharide production from sweet potato-shochu distillery wastewater by *Lactobacillus* sakei CY1, *Biotechnology and Biotechnological Equipment*, 2011, 25 (2), 2329-2333).

Thus, even if polyacrylamide and its derivatives produced from petroleum are the most used synthetic flocculants because of their high efficiency at low dosage and their easy handling, the search for alternative products is essential, both for the environmental protection and health aspects.

Thus, there is a need, in clarification processes, to develop the use of coagulants/adjuvants/flocculants based on bio-products, on the one hand, to reduce the dependence of the water treatment plant on added chemical reagents, and, on the other hand, to promote the use of biological polymers with a lower impact on the environment and on human health.

Bacterial exopolymers (EPS) are biopolymers that are secreted or released by microbial cells and remain in part more or less strongly associated with the cell surface (for example in capsules). These biopolymers are mainly composed of proteins, carbohydrates, lipids and/or nucleic acids.

Bacterial EPS, and in particular the fraction comprising exopolysaccharides, may present for some, excellent flocculating properties and may thus be a satisfactory alternative to synthetic polymers such as PAM.

Most of the studies concerning the production of EPS illustrate the production of EPS through pure cultures, either by well-known organisms (*Pseudomonas, Bacillus*, lactic bacteria, fungi, etc.), or from isolates made from various sources (activated sludge, soils, waste, etc.) and then used as pure cultures. Although the production of EPS by microbial way is considered as respectful of the environment because based on the use of renewable carbon and in phase with the concept of biorefinery, the microbial EPS constitute only a minor fraction of the current market of the flocculant polymers because of the high cost of their production and the difficulty of their recovery.

For this reason, much effort has been devoted to the development of cost-effective production processes by using less expensive culture substrates. These substrates are generally derived from residues in liquid form such as syrups, molasses, juices, cheese whey and wastewater in general or from solid matters such as lignocellulosic biomass and organic waste. These means of production have unfortunately their drawbacks. One of the major drawbacks is the use of so-called "pure" cultures both in terms of the associated sterilization requirements and the inability of pure bacterial strains to use the diversity of present substrates.

There is thus a need to provide a product with sufficient flocculent properties to replace synthetic polymers that may have an impact on health, to free oneself from dependence on the supplier and to apply a principle of circular economy with short supply chain by producing the product with flocculent properties at the place where it is needed, to valorize wastes and by-products by producing products with flocculant properties from these residues, wastes, by-products containing carbohydrates and eventually to be able to export them easily in order to increase the profitability of the water treatment plant.

BRIEF SUMMARY

The disclosure thus relates to a process for producing a microbial cellular biomass having flocculant properties comprising the steps:
a) introduction into a reactor:
  of a substrate possibly comprising a microbial inoculum and comprising at least 30% by weight of monosaccharides, preferably selected from the group comprising hexoses and pentoses; and
  optionally nutrients for the microbial inoculum,
  the resulting reaction medium having a C/N molar ratio of less than or equal to 10 and a dilution rate D of less than or equal to 0.35 $h^{-1}$;
b) stirring of the reaction medium obtained in a) and retention of the C/N ratio at a value less than or equal to 10 and the dilution rate D at a value less than or equal to 0.35 $h^{-1}$;
c) elimination of any filamentous bacteria and filamentous fungi by sequential decantation of the obtained biomass in b); and
  obtention of the microbial cellular biomass having flocculant properties.

DETAILED DESCRIPTION AND EXAMPLES

By "substrate", is meant any hydrolysate or mixture comprising a carbon source (monosaccharides), pasteurized or unpasteurized, purified or unpurified, filtered or unfiltered, comprising at least 30% by weight of sugars (monosaccharides) from any biomass. It can be, for example, a hydrolysate of wood, straw and more generally any lignocellulosic biomass, cereals, roots (ex: Beet), fruits but also residues or co-products and organic solid waste possibly biodegradable having, a high fraction of sugars, including those indicated in the Report of the Agency for the Environment and Energy Management (ADEME: panorama of co-products and biomass residues for use of chemical and biobased materials channels in France), September 2015. The substrate can, in some cases, be a culture medium, if it includes all the nutrients for the microbial inoculum.

Advantageously, when the substrate is a hydrolysate, it can be obtained by any chemical, thermal or biological hydrolysis method known in the art such as for example enzymatic hydrolysis in an acid medium (Kumar, P., Barrett, D. M., Delwiche, M. J., & Stroeve, P., Methods for Pretreatment of Lignocellulosic Biomass for Efficient Hydrolysis and Biofuel Production. *Industrial & Engineering Chemistry Research*, 2009, 48(8), 3713-3729)

Advantageously, the substrate may comprise at least 40% by weight of monosaccharides. Preferably the substrate comprises at least 50% by weight of monosaccharides, and even more preferably from 70 to 100% by weight of monosaccharides, or even from 90 to 100%.

Advantageously, the substrate may comprise a hydrolysate and/or monosaccharides.

By "monosaccharide", is meant the monomer of carbohydrates. The monosaccharides have at least 3 carbon atoms: they are poly hydroxyaldehydes (aldoses) or poly hydroxyketones (ketoses). They are not hydrolyzable. They are very soluble in water and generally have a sweetening power. They are distinguished by the length of their carbon chain. An n-carbon monosaccharide is composed of an unbranched carbon chain, n ranging from 3 to 7 carbons, containing only single bonds. All the carbons carry an alcohol function (OH) except one which carries a carbonyl function. This determines two categories of monosaccharides. One calls "aldose", a monosaccharide whose carbonyl function is an aldehyde function, it is on the first carbon (for example glucose). One calls "ketose", a monosaccharide whose carbonyl function is a ketone function, it is on the second carbon (for example fructose).

Advantageously, the monosaccharides can be chosen from the group comprising the hexoses and the pentoses. For example, the substrate may comprise aldohexoses (for example glucose; galactose), ketohexoses (for example fructose; sorbose), aldopentoses (for example xylose; arabinose; ribose), or ketopentoses (for example ribulose; xylulose) and mixtures thereof.

Advantageously, the substrate may comprise a microbial inoculum, comprising in particular heterotrophic bacteria. The microorganisms of said substrate can be selected from the group comprising gammaproteobacteria, flavobacteria, alphaproteobacteria and betaproteobacteria. For example, they may be bacteria belonging to taxonomic classes such as gammaproteobacteria, flavobacteria, alphaproteobacteria and beta-proteobacteria. For example, gammaproteobacteria can be *Citrobacter, Klebsiella* and *Raoultella* of the Enterobacteriaceae family and *Acinetobacter* of the Moraxellaceae, flavobacteria can be *flavobacterium* or flavobacteriaceae, the alphaproteobacteria can be *Rhodobacter* (Rhodobacteraceae) or Novosphingobium (Sphingomonadaceae) and the Betaproteobacteria can be Comamonas (Comamonadaceae). Advantageously, the microorganisms selected during the implementation of the process according to the invention can for example be said heterotrophic bacteria previously mentioned, these microorganisms being then able to produce bacterial EPS.

By "Biomass", is meant a mass comprising living microorganisms.

By "microbial cellular biomass having flocculating properties", is meant biomass having flocculating power containing microbial compounds comprising exopolysaccharides (EPS), pure or in mixture with other substances (for example proteins) having flocculating properties and being able to substitute synthetic polymers such as polyacrylamides for example.

By "bacterial exopolysaccharides", is meant EPS secreted or released by microbial cells and which remain in part more or less strongly associated with the cell surface. Bacterial exopolysaccharides can thus be produced by the cells and accumulate around the cells. These polysaccharides are homo- or hetero-polysaccharides mainly composed of carbohydrates, glucose, galactose and mannose being the most common monomers. In the case of heteropolysaccharides, one observes for example: D-glucose, D-galactose, L-rhamnose with sometimes, N-acetylglucosamine, N-acetylgalactosamine, or glucuronic acid, but also gulluronic and manuronic acids. Other neutral sugars (for example rhamnose and fucose), certain uronic acids (mainly glucuronic and galacturonic acids) and osamines (N-acetylamino sugars) are also frequently encountered. In addition to carbohydrates, bacterial EPS can contain several substituents (such as acyl and/or pyruvate groups). The presence of some of these acyl groups gives the EPS an anionic character, increases its lipophilic character and affects its ability to interact with other polysaccharides and cations.

By "activated sludge", is meant a microbial biomass used for wastewater treatment that organizes itself into floc. Activated sludge consists primarily of heterotrophic organisms, which means that utilize organic matter and acquire energy through oxidation or respiration, or even fermentation. Some of these microorganisms produce EPS which are responsible for the flocculation observed in activated sludge.

By "Undesirable microorganisms", is meant bacteria or fungi, in particular filamentous bacteria and filamentous fungi, which do not have any flocculating properties and in particular do not produce the EPS responsible for the observed flocculation of activated sludge.

By "decantation", is meant any process in which particles are separated by a difference in density, for example centrifugation, hydrocyclone or sedimentation.

Advantageously, step a) of the process according to the invention comprises an introduction into a reactor of a substrate and optionally nutrients for the microbial inoculum. This mixing leads to the formation of a culture medium in the reactor (reaction medium). The substrate can in some cases meet the definition of culture medium.

Advantageously, the substrate may be supplemented by the introduction of nutrients for the inoculum. Depending on the composition of the substrate, the introduction of nutrients allows to obtain, in the reactor, a culture medium that is suitable for the proliferation of the microorganisms. It can be a complementary source of carbon, potassium, phosphorus, nitrogen, sulfur, magnesium, calcium, iron, sodium, chloride and trace elements (salts of Cu, Zn, Co, Ni, B, Ti, Mo), water or a pH buffer. The nitrogen source can be mineral and is preferably in the form of $NH_4^+$ ion (in equilibrium with $NH_3$) but can also be in the form of nitrates or nitrites. The nitrogen source can also be organic (amino acids, peptides, proteins, nucleic acids). The nitrogen source can be urea or a derivative of urea (urines) or a nitrogen fertilizer. The substrate can also be a source of nitrogen. The nitrogen source can be a mixture of the above sources. The source of phosphorus may be, for example, phosphoric acid, a phosphate or polyphosphate or a mixture thereof.

Advantageously, the C/N ratio of the mixture obtained in step a) is a molar ratio. The values of C and N are expressed in moles. The C/N molar ratio may have a value less than or equal to 10, preferably in the range of 1 to 10 and even more preferably in the range of 7 to 10. The measurement of the total reduced nitrogen "N" (organic and inorganic) is done by the so-called Kjeldahl method. The measurement of the reduced mineral nitrogen ($NH_4^+$) is done by the Kjeldahl method or by the HPLC ionic chromatography or by the colorimetric method of Nessler. The carbon "C" is measured by the TOC (Total Organic Carbon). It is taken into account in the "C" value, only of the biodegradable organic carbon which is the one that is degraded in the reactor. The C/N ratio can be measured and adjusted on the basis of samples taken within the reactor or on the inputs and outputs of the reactor (for example on the basis of an input/output balance).

Advantageously, the dilution ratio D in the reactor may be less than or equal to $0.35\ h^{-1}$, preferably in a range from 0.05 to $0.30\ h^{-1}$, and even more preferably in a range from 0.08 to $0.20\ h^{-1}$ or even 0.09 to $0.014\ h^{-1}$. The dilution rate is the ratio of the liquid flow rate ($m^3 \cdot h^{-1}$) entering the reactor on the liquid volume of said reactor ($m^3$). In the case of a semi-continuous reactor, the dilution rate calculation is done over the cycle time. The liquid may eventually include suspended solids, including for example substrate, inoculum, and other elements.

Advantageously, the pH in the reactor is in the range of 6 to 9, preferably 6.5 to 8 or even 6.8 to 7.8.

Advantageously, the mixture obtained in step a) has a C/P molar ratio less than or equal to 600. The C/P ratio of the mixture obtained in step a) is a molar ratio. The C and P values are expressed in moles. The C/P molar ratio can have a value of less than or equal to 600, preferably less than or equal to 100 and even more preferably in the range of 40 to 100. The value of C is the same as in the C/N ratio. The measurement of phosphorus can be carried out by digestion in an acid medium and in the presence of persulfate, the solubilized phosphorus is then dosed by colorimetry according to the NF EN 14672 standard of December 2005. Generally, in the process according to the invention, when the dilution rate D increases, the required C/P ratio decreases. For example, when the dilution ratio D is in the range of 0.25 to $0.35\ h^{-1}$, the C/P ratio may be in the range of 40 to 70. When the dilution ratio D is in the range of 0.14 to $0.25\ h^{-1}$, the C/P ratio may be less than or equal to 600. When the dilution ratio D is in the range of 0.09 to $0.14\ h^{-1}$, the C/P ratio may be in the range of 40 to 600. For example, when D is about $0.12\ h^{-1}$, C/P may be less than or equal to 100, preferably in the range of 40 to 100 or even in the range of 40 to 60.

Advantageously, step b) of the process according to the invention comprises a stirring of the reaction medium obtained at the end of step a). This may be mechanical or magnetic stirring.

Advantageously, in step b) according to the process of the invention, the duration of stirring may be in a range from a few minutes to several hours, days or months. The duration of step b) may depend on the frequency with which step c) is implemented.

Advantageously, throughout the duration of step b), the C/N ratio may be maintained at a value less than or equal to 10, preferably in a range from 4 to 10 and even more preferably in a range of from 7 to 10.

Advantageously, the C/N ratio of steps a) and b) is identical.

Advantageously, throughout the duration of step b), the dilution rate D can be maintained at a value less than or equal to $0.35\ h^{-1}$, preferably in a range of from 0.05 to 0.30 $h^{-1}$, and even more preferably in a range of from 0.08 to 0.20 $h^{-1}$ or even from 0.09 to $0.14\ h^{-1}$.

Advantageously, the dilution rate D of steps a) and b) is identical.

Advantageously, the imposition of a dilution rate D in the reactor sets a residence time of the cells in the reactor and indirectly imposes a minimum specific growth rate p on the not decanted cells, thus allowing the elimination of the unwanted cells.

Advantageously, throughout the duration of step b), the C/P ratio can be maintained at a value less than or equal to 600, preferably less than or equal to 100 and even more preferably in a range from 40 to 100.

Advantageously, the C/P ratio of steps a) and b) may be identical.

Advantageously, step c) of the process according to the invention may comprise a removal of any filamentous bacteria and filamentous fungi, and possibly other undesirable microorganisms, by sequential decantation of the biomass obtained in step b).

Advantageously, step c) of the process according to the invention may be implemented alternatively or simultaneously with step b). The process may comprise one or more iterations of steps a), b) and/or c), said steps a), b) and/or c) being consecutive or simultaneous. In particular, in the context of a continuous operation, steps a) and b) may be simultaneous or consecutive.

Advantageously, step c) can be carried out directly in the reactor or else on the effluents from the reactor. When step c) is carried out in the reactor, the stirring is stopped, and the biomass obtained in step b) is then left to decant in the reactor. The resulting decanted solid, including any filamentous bacteria and filamentous fungi, and possibly other undesirable microorganisms, is removed from the reactor, for example via a partial purge of the liquid volume of the reactor. When step c) is carried out on the effluent from the reactor, the decanted solid is then removed and the residue, which contains in particular bacteria having flocculant properties, is reinjected into the reactor. In this embodiment of the process, step c) can be carried out simultaneously with step a) and/or b) because the stirring does not need to be interrupted to allow the decantation of the reaction medium. Step c) of the process of the invention prevents the accumulation of undesirable microorganisms, in particular filamentous microorganisms (bacteria or fungi) in the reactor. Step c) may further allow to remove other undesirable microorganisms whose decantation velocity is higher than that of the microorganisms produced during the process, in particular bacterial EPS.

Advantageously, in step c) according to the process of the invention, the duration of the decantation is sufficient to remove filamentous microorganisms having a sedimentation velocity in the range of 0.1 meter per hour to 20 meters per hour and more generally in the range of 0.5 m/h to 5 m/h.

By "sufficient decantation time", is meant the time necessary, in a given reactor, for the undesirable microorganisms to have time to reach the fraction of the reaction medium that will be purged. For example, the decantation time of step c) for a reaction medium having a volume of 8 L and a height of 25 cm, of which 110% by volume are purged, is 4 to 5 minutes. The removed microorganisms are, for example, bacteria of the genus *Sphaerotilus*, in particular the species *S. natans*. The person skilled in the art will know how to adapt the duration of step c), depending on the type of filamentous microorganisms to be eliminated and the parameters of temperature, viscosity, volume and height of the reaction medium, in order to eliminate a sufficient quantity of filamentous microorganisms, in particular also depending on the shape of the reactor and the volume fraction of the purged reaction medium.

Advantageously, step c) allows, during the implementation of the process of the invention, the residence time of the undesirable microorganisms to be less than that of the microorganisms having flocculent properties.

Advantageously, when the process comprises several steps c) according to the process of the invention, the frequency of implementation of step c) is preferably in the range of from 1 to 60 times per day and even more preferably in the range of from 15 to 30 times per day.

Advantageously, the ratio $t_c/t_b$ (duration of step c/duration of step b) has a value ranging from 0.01 to 0.40, preferably from 0.05 to 0.30. The ratio $t_c/t_b$ is defined as the duration of a step c)/the duration of a step b), when step c) is implemented in the reactor and as the sum of the durations of step c)/the duration of step b), when step c) is carried out on the effluents from the reactor.

Advantageously, the production of the microbial cellular biomass having flocculant properties occurs continuously during steps b) and/or c).

Advantageously, the process according to the invention may further comprise an inoculation step of the reactor with one or more microorganisms. This inoculation step of the reactor may, for example, comprise the introduction of an activated sludge, an inoculum from another biological wastewater treatment process, for example a biofilter, a bacterial bed, a lagoon process, but also a soil or waste extract, organic residues or an inoculum selected on the basis of simple sugar and ammonium ions, according to the process of the invention, preferably at a C/N molar ratio of 10 or less. This inoculation step is a so-called priming step and can take place prior to step a), in particular when the envisaged substrate for the implementation of the process does not contain microorganisms or if they are not in sufficient number or sufficiently viable in the substrate to initiate the process according to the invention. During this step, the microorganism or microorganisms of interest grow in such a way that it can then produce the biomass during the implementation of the process.

Advantageously, the concentration of microorganisms from the inoculum or substrate can generally represent at least 10 mg of viable cells in dry mass per liter of liquid volume in the reactor.

Advantageously, the process according to the invention may further comprise a step of injecting into the reactor an additional monosaccharide or mixture of monosaccharide. This step may be implemented at any time during the implementation of the process to adjust the C/N ratio, or during the priming step or to promote the selection and production process of the microbial cellular biomass having flocculant properties.

Advantageously, the process according to the invention is implemented in a continuous or semi-continuous reactor. When operating in a continuous reactor, the growth, the selection of microorganisms and the production of the microbial cellular biomass having flocculant properties occurs in steps a), b) and c), within the same reactor. The process can also be implemented in several reactors, steps a), b) and c) being implemented in a first reactor, leading to the growth and selection of microorganisms. The step of producing the microbial cellular biomass having flocculant properties can then be carried out in a second reactor.

Advantageously, the process according to the invention can be carried out at a temperature of 4 to 55° C., preferably 10 to 30° C., even more preferably at room temperature. The ambient temperature may vary depending on the location and season, but is generally in the range of 15 to 25° C.

Advantageously, the process according to the invention can be carried out in an open environment, under ventilation. The ventilation of the reaction medium can be carried out in the open air or under forced ventilation. The gas used for ventilation can be air, or a mixture enriched with oxygen. Preferably, the ventilation is interrupted during step c) in order to promote decantation.

Advantageously, the process of the invention is carried out in a sterile or non-sterile environment, preferably non-sterile. An advantage of the process according to the invention is that it can be implemented in a non-sterile environment, for example an environment open to the outside and subject to contamination.

Advantageously, the process according to the invention can further comprise a step of total emptying of the reactor comprising cleaning of the reactor and reintroduction of the reaction medium. This step may in some cases make it possible to avoid the formation of biofilms on the walls of the reactor, on the probes and on the blades of the mechanical stirrer or the magnetic stirrer.

Advantageously, the process according to the invention is carried out for a period of time ranging from 1 day to several months.

Advantageously, the process can have a minimum implementation time depending on the dilution ratio D. Preferably, the process is implemented for a duration at least equal to $4*1/D$. For example, when $D=0.12$ $h^{-1}$, the process is run for at least 1.5 days. This duration may correspond to the duration of selection of the microorganisms that will then produce the EPS and form the microbial cellular biomass having flocculant properties obtained according to the process of the invention.

Advantageously, the process according to the invention may further comprise a step of dehydrating the microbial cellular biomass having flocculant properties obtained according to the process of the invention. The dehydration step may be carried out by drying (supply of heat by conduction, convection or radiation, or by the use of a gas) or by freeze-drying.

Advantageously, the process according to the invention may further comprise any step allowing the preservation of the biomass according to the invention by lowering the activity of water, in particular as a solvent, in order to limit the degradation reactions of the biomass according to the invention.

Advantageously, the process according to the invention may further comprise a wastewater treatment step. Said wastewater treatment step may comprise a step of contacting wastewater with a coagulant and the microbial cellular biomass having flocculant properties. Preferably, the step comprises contacting wastewater with a coagulant and then with the microbial cellular biomass having flocculant properties.

The invention also consists of a microbial cellular biomass having flocculant properties obtained according to the process of the invention.

A flocculation effect is defined on the basis of Stokes law and showing an increase in the sedimentation velocity of colloidal and suspended matter of typical elements (for example of density 1100 $kg/m^3$), such as for example bacteria (diameter 1 μm, decantation velocity=1.5 $10^{-4}$ m/h), colloids (diameter 0.1 μm, decantation velocity=1.5 $10^{-6}$ m/h) or colloids (diameter 0.01 μm, decantation velocity=1.5 $10^{-8}$ m/h). Advantageously, the microbial cellular biomass having flocculant properties obtained according to the process of the invention makes it possible to obtain particle diameters (flocs) of at least 100 μm, generally between 100 μm and 1 mm, leading to respective sedimentation velocities of these same elements, under the same conditions, between 1.5 m/h and 150 m/h. These speeds are compatible with sedimentation processes classically used in the art.

Advantageously, the microbial cellular biomass having flocculant properties according to the invention comprises EPS, preferably bacterial exopolysaccharides. The microbial cellular biomass having flocculating properties according to the invention has a flocculating power equivalent or even superior to that of the polymers produced by chemical synthesis classically used in water treatment plants, such as, for example, anionic polyacrylamide (for example Floerger-type AN 934 SH).

Polyacrylamide is defined as a polymer having the formula $[-CH_2-CH(-CONH_2)-]_n$, formed from acrylamide monomers. Depending on the intended use, the polyacrylamide can be functionalized. It can thus be ionic (cationic or anionic) or non-ionic. The functionalized polyacrylamide can for example be a copolymer synthesized by copolymerization of acrylamide monomers and acrylic acid monomers or by hydrolysis of the amide group of the polyacrylamide. The PAM of type AN 934 SH is a functionalized, anionic polyacrylamide comprising about 30 mol % of charges and having an average molecular weight Mw ranging from $1.3.10^6$ to $1.6.10^6$ Da. Its water content is less than 13%. It also has a viscosity ranging from 5.7 to 6.5 cPs and a density of 49.92 lbs/ft$^3$ (manufacturer data).

"Flocculation" is defined as the physical-chemical process by which suspended matter in a liquid agglomerate to form larger particles (flocs). The "flocculating power" consists in measuring the efficiency of the agglomeration effect of the suspended matter. This flocculating power is for example often measured in relative with respect to references such as turbidity removal in the presence or absence of the flocculant in a sedimentation test. For example, PAM AN 934 SH (0.2 ppm), associated with ferric chloride (20 mg/L) allows a treatment efficiency (1-turbidity/control turbidity without any addition)>60% on UW (Urban Wastewater). The PAM AN 934 SH (0.2 ppm), associated with ferric chloride (2 mg/L) allows a treatment efficiency (1-turbidity/control turbidity without any addition)>85% on kaolinite. Under the same conditions, the microbial cellular biomass having flocculant properties according to the invention gives equivalent results, or even much higher, of 60 to 99% on UW and 85 to 99% on kaolinite.

Advantageously, in the presence of a coagulant, the microbial cellular biomass having flocculant properties according to the invention has a flocculating power which leads to a removal of turbidity from a wastewater equal to at least 50% of the flocculating power of anionic polyacrylamide (AN 934 SH) under the same conditions (UW, temperature), preferably at least 100%, for example between 100% and 500%.

An additional advantage of the microbial cellular biomass having flocculant properties according to the invention is to lead to a strong decrease of the chemical oxygen demand (COD) of the clarified UWs, the COD being an indirect measure of the pollution of said UWs.

Advantageously, the microbial cellular biomass having flocculant properties according to the invention may be purified or unpurified before being use.

Advantageously, the microbial cellular biomass having flocculant properties can be in hydrated or dehydrated form. In dehydrated form, it offers the additional advantage of limiting the costs associated with its possible transportation.

The invention also relates to a use of the microbial cellular biomass according to the invention in the treatment of an aqueous and/or oily solution or suspension, in particular wastewater (urban, industrial or agricultural), river water, storm water, runoff water, mining water, cleaning water, oil or gas. The microbial cellular biomass according to the invention can be used in any type of aqueous solution or suspension requiring flocculation.

The invention further relates to a wastewater treatment process comprising a step of contacting an aqueous and/or oily solution or suspension with a coagulant and a microbial cellular biomass according to the invention.

Advantageously, the coagulant may be any coagulant used in known treatment processes. In particular, it may be selected from the group comprising trivalent ions of iron and aluminum salts, preferably $FeCl_3$. The coagulant may also be selected from the group comprising biopolymers or biobased substances having the properties of coagulants (for example: tannins, chitin, modified starches).

Advantageously, the use or the treatment process according to the invention can be implemented to flocculate minerals and/or organic matter in contexts other than water treatment, in all environments where a flocculant is useful. In particular, the use or the treatment process according to the invention can be implemented upstream of the filtration membranes to limit clogging or else to assist in the removal of water in the downstream sludge dewatering/drying steps.

Advantageously, the use or treatment process may include a step of rehydration or dilution of the microbial cellular biomass having flocculant properties according to the invention.

Figure 4:
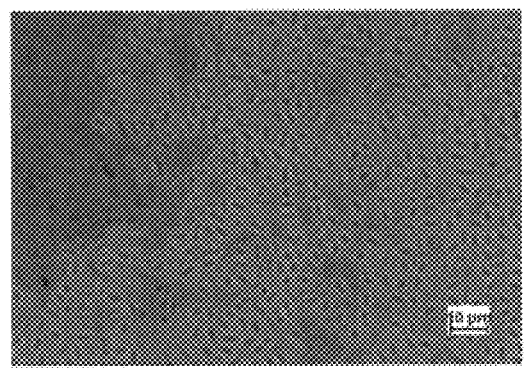

FIG. 4 represents an enlarged view (Scale: 10 μm) of bacterial exopolysaccharides included in a microbial cellular biomass according to the invention. It can be observed, thanks to Indian ink staining, the relatively compact layer that surrounding the bacterial wall and constituting the capsule, which is formed of viscous molecules elaborated by the bacteria (it is also possible to use other stains such as Alcian blue staining, which, at pH 2.5, adheres to negatively charged macromolecules and then colors the acidic polysaccharides in blue).

Figure 5:
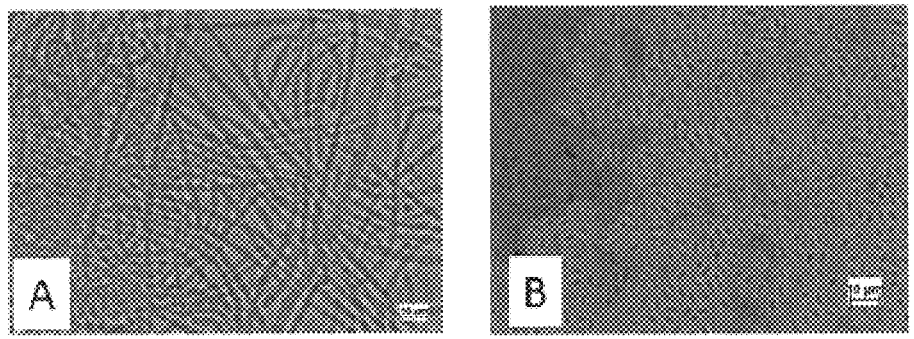

FIG. 5 represents a comparison between A) a photograph of microscopic observations of consortium dominated by

*Sphaerotilus* (selection process carried out without selective purging, that means without step c) of the process) and B) a photograph of microscopic observations of consortium dominated by biomass having flocculant properties (selection process carried out with selective purging of filamentous bacteria); enlarged view (Scale: 10 µm). This comparison shows that in the absence of process step c), filamentous bacteria and fungi are not eliminated.

The invention will be better understood upon reading the following non-limiting examples.

Example 1: Implementation of the Process According to the Invention

Inoculum and Culture Media

A reactor under stirring and ventilation is inoculated with activated sludge from the Ginestous water treatment plant, France) collected and maintained according to Cavaillé et al. (Cavaillé et al. 2016. "Understanding of Polyhydroxybutyrate Production under Carbon and Phosphorus-Limited Growth Conditions in Non-Axenic Continuous Culture." Bioresource Technology 201 (February): 65-73. https://doi.org/10.1016/j.biortech.2015.11.003).

The sludge is centrifuged at 4100 g for 15 minutes and the supernatant is then removed. The pellet is recovered, and aliquots are frozen in liquid nitrogen and stored at −20° C.

The inoculum thus prepared, before the seeding of the reactor, an aliquot is thawed for 15 hours at a temperature of 4° C. and then rinsed with a saline solution (0.9% w/v NaCl) by means of three successive centrifugations (4100 g-15 min). Before inoculation of the reactor, the sludges are fed-batch for 24 h with additions of 1.8 g/L of an equimolar mixture of fructose and glucose.

The reactor is seeded with an initial activated sludge concentration of 1.5 g/L of suspended volatile matter.

The culture medium is composed of a first solution containing the source of carbon, nitrogen and phosphorus. This is a feed containing a carbon source (in the example an equimolar mixture of glucose and fructose), a phosphate buffer solution and ammonium added according to the degree of nitrogen limitation chosen, here so as to obtain a (C/N) ratio consumed of 8.5 (molar).

A second solution is added containing the mineral salts and trace elements required for microbial cultures (Table 1).

TABLE 1

| Compound | Concentration |
| --- | --- |
| Ferric Ammonium Citrate Solution at 250 g/L ($C_6H_5$ + $4yFe_xN_yO_7$ with approximately 28% Fe) | 0.1 mL/L |
| $MgSO_4 \cdot 7H_2O$ Solution at 250 g/L | 0.2 mL/L |
| KOH Solution at 250 g/L | 0.07 mL/L |
| $H_2SO_4$ 96% v/v | 0.035 mL/L |
| Solution "traces of elements" (0.3 g/L $H_3BO_3$, 0.21 g/L $CoCl_2$ $6H_2O$, 0.11 g/L $ZnSO_4$ $7H_2O$, 0.04 g/L $MnCl_2$ $4H_2O$, 0.03 g/L $Na_2MoO_4$ $2H_2O$, 0.02 g/L $CuSO_4$ $5H_2O$ et 0.01 g/L $NiCl_2$ $6H_2O$) | 0.1 mL/L |

In order to evaluate the effect of constant microbial contamination on the efficiency of microbial selection, a continuous flow of diluted activated sludge is injected into the reactor. This flow rate is chosen to bring a flow of contaminating cells corresponding to 5% of the cell production of the reactor (5% of $r_x$ (g/(L·h)−0.1 g/L/h), that is approximately 0.005 g/L/h under stable conditions with a CODp around 0.8 g/L in the reactor. Despite this continuous supply of contaminating cells, selection of cellular biomass with flocculant properties occurs.

Production of Cellular Biomass with Flocculent Properties

The substrate used includes the elements in Table 2 below:

TABLE 2

| Compound | Mass concentration in the reactor (g/L) | Molar concentration in the reactor (mol/L) |
| --- | --- | --- |
| Glucose | 0.766 | 0.025 |
| Fructose | 0.766 | 0.025 |
| N (essentially $NH_4Cl$) | 0.32 | 0.0059 |
| P (phosphate buffer solution) | 0.033 | 0.001 |
| C/N | 8.5 | |
| C/P | 50 | |

The microorganisms selected by the process are essentially of the Comamonadaceae type. These microorganisms produce bacterial EPS.

Figure 1:
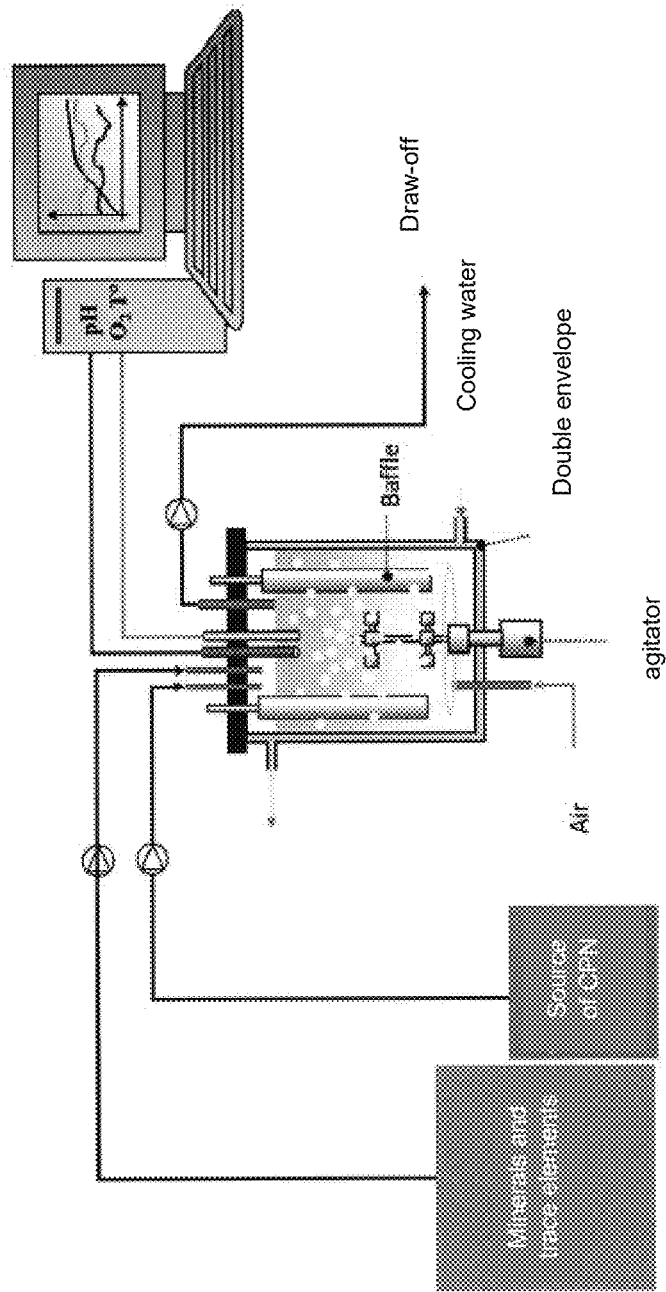
FIG. 1 is a schematic representation of the implementation of the process of the invention comprising a continuous reactor, a mineral and trace element supply system, a substrate supply system, source of phosphorus and nitrogen (CPN), an air supply system, a mechanical agitator, a purge line, a draw-off system, baffles and a device for controlling the dilution rate and the C/N and C/P ratios.

A reactor of 8 L of useful volume (10 L in total) (FIG. 1) equipped with a double jacket was used. Stirring fixed at 130 RPM is provided by Rushton turbines and two counter blades of 5 cm wide. To regulate the dissolved oxygen concentration at (2.5±0.5) mg/L, flow meters (EL-FLOW®, Bronkhorst High-Tech B.V., France) were used. The temperature was regulated at 25° C.±1° C., and the pH was maintained at 7.0±0.3 with the addition of potassium hydroxide (KOH, 1M). The operating conditions and on-line data acquisition (dissolved oxygen concentration, pH and temperature) are controlled via an acquisition software.

Twice a month, the reactors are emptied for cleaning in order to avoid the formation of biofilms on the walls, on the probes and on the blades. When deemed necessary, feeder hoses are replaced.

The reactors are operated in a sequential manner, with a feed and stirring phase (55 min) followed by a decantation phase (4 min 30 sec) and then a purge phase (30 sec). The purging of the reactors is carried out thanks to 3 taps at the bottom of the tank, connected to recovery tanks. At each cycle, the fed volume is equivalent to the volume purged of 960 mL (purge rate of 1.9 L/min). Since the useful volume is 8 L, the hydraulic retention time is 8.33 h (dilution rate $D=0.12 \, h^{-1}$).

The microbial cellular biomass having flocculant properties A is obtained.

Example 2: Evaluation of the Flocculent Properties of Microbial Cellular Biomasses Having Flocculent Properties According to the Invention The flocculent properties are evaluated on a representative effluent, here an urban wastewater (UW).

Figure 2:
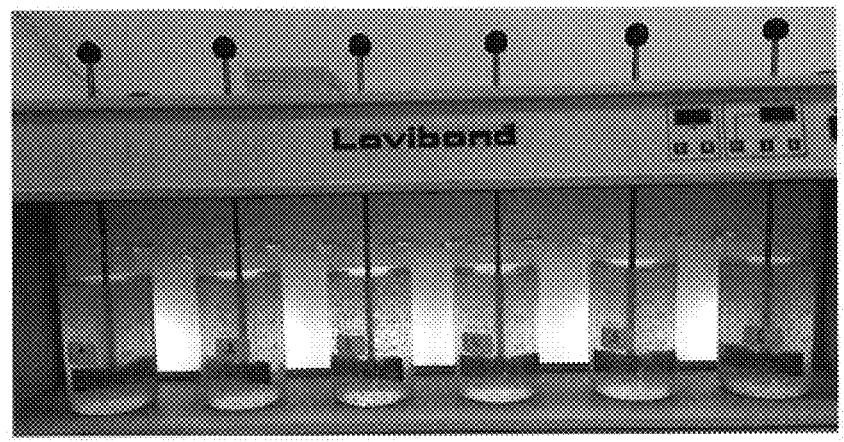
FIG. 2 represents a photograph of the called-so "jar-test" apparatus used to carry out the flocculation tests, the six beakers being filled with urban wastewater.

The flocculation tests are performed in jar-tests (Lavibond®—Amesbury, United Kingdom, Floc-Tester model, SN: 1013/61444) under identical conditions (stirring velocities, duration of the phases) for each coagulant/flocculant combination. A photograph of the so-called jar-tester system is shown in FIG. 2.

The coagulant used is ferric chloride. For each test, 6 beakers filled with 900 mL of UW are used. The first three beakers are used as reference (no 1: control (no addition), no 2: $FeCl_3$ 20 mg/L alone, no 3 $FeCl_3$ 20 mg/L+polyacrylamide AN934SH (named PAM) 0.2 mg/L). The three remaining beakers are used for the evaluation of biomass A at 3 different concentrations (no 4, no 5, no 6 $FeCl_3$ 20 mg/L+ biomass A). Biomass A is used directly without prior extraction or purification. The dosage is evaluated by measuring the total chemical oxygen demand (COD). Generally, concentrations of 1, 6 and 12 mgCOD/L are implemented in the three test beakers.

After stirring and measuring the initial turbidity (Turb 0), the protocol includes three main steps: (i) addition of coagulant (FeCl$_3$— 20 mg/L) in all beakers except the control and stirring at 150 rotations per minute (RPM) for 3 min; (ii) addition of flocculant (PAM 0.2 mg/L—Biomass A 1-6-12 mgCOD/L in beakers 4 to 6) and stirring at 50 RPM for 15 min; (iii) settling for 1 min and sampling at 2.2 cm from the surface for turbidity measurement (Turbx)

The results are analyzed in terms of the purification yields (in %) calculated as follows:

Purification yield (% $r$)=(Turb0−Turbx)/Turb0(*100)

The purification yields obtained are related to the reference containing only ferric chloride (beaker 2). When the purification yield obtained with the biomass according to the invention is higher than that obtained with ferric chloride alone, a positive gain is calculated as follows:

GainBiomassX (vs FeCl$_3$)=(% $r_x$−% $r_{FeCl3}$)/% $r_{FeCl3}$

GainPAM (vs FeCl$_3$)=(% $r_{PAM}$−% $r_{FeCl3}$)/% $r_{FeCl3}$

Finally, the performances obtained are systematically compared to those obtained with PAM AN 934 SH: Performance compared to PAM=GainBiomassX/GainPAM. This result analysis allows to get rid of the great variability of wastewater in terms of composition and their behavior towards the coagulants and flocculants used.

Figure 3:
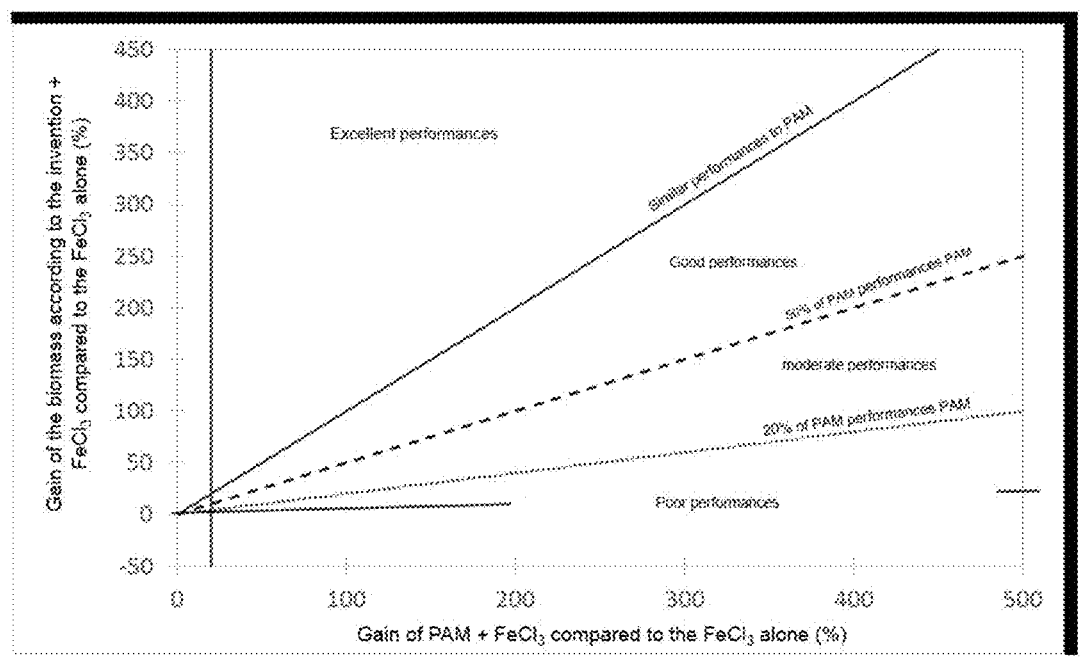
FIG. 3 represents an analysis of the performance of biomasses obtained by the process according to the invention. On the abscissa axis is plotted the gain of the commercial polymer (PAM AN 934 SH) compared to the coagulant $FeCl_3$ alone (in percentage), and on the ordinate axis is plotted the gain (%) of the biomass according to the tested invention compared to $FeCl_3$ alone.

The method of representation is given in FIG. 3.

Four levels of performance are defined: poor (less than 20% of MAP gain), average (between 20% and 50% of MAP), good (between 50% and 100% of MAP) and excellent (greater than MAP gain).

Table 3 presents the results obtained with biomasses according to the invention (reference and variant 1 and 2), namely excellent flocculation performance (i.e., superior to that of PAM AN 934 SH). The operating conditions and results of two variants are also presented, which also provide satisfactory performance.

TABLE 3

|  | Reference | Variant 1 | Variant 2 |
| --- | --- | --- | --- |
| Operating conditions | | | |
| inoculum | Activated sludge | Activated sludge | Consortia Reference |
| Substrate | Glucose/fructose | Glucose/fructose | Hydrolysate |
| Mainly selected microorganisms | Mainly Comamonadaceae | Mainly Comamonadaceae | Mainly Comamonadaceae |
| C/N | 8.5 | 9.5 | 8.5 |
| C/P | 48 | 48 | 48 |
| D (h$^{-1}$) | 0.12 | 0.12 | 0.12 |
| Cycle duration (steps b + c) | 1 h | 1 h | 1 h |
| Decantation duration (step c) | 4 min 30 sec | 4 min 30 sec | 4 min 30 sec |
| Results | | | |
| Flocculating properties on UW du AN 934 SH (or GainPAM vs FeCl3) | 101% à 490% | 110% à 200% | 450 à 550% |
| Flocculating properties on UW of the biomass according to the invention | Excellent | Good | Excellent |
| Flocculating properties on kaolinite of the biomass according to the invention (value of AN 934 SH) | n/d | Excellent (72%) | n/d |
| Flocculating properties on diluted digestate of the biomass according to the invention (value of AN 934 SH) | n/d | Good (465%) | n/d | n/d = not determined.

In variant 2, the hydrolysate is derived from enzymatically hydrolyzed screenings rejects (hemicellulases, endo-β-1,4-glucanases, endo-β-D-xylanase).

Example 3: Counterexamples

Table 4 shows some operating conditions that did not lead to the stable production of biomass with flocculent properties (counterexamples 1 and 2).

TABLE 4

|  | Reference | Counterexample 1 | Counterexample 2 |
|---|---|---|---|
| Operating conditions | | | |
| inoculum | Activated sludge | Activated sludge | Activated sludge |
| Substrate | Glucose/fructose | Glucose/fructose | Glucose/fructose |
| C/N | 8.5 | 9 (to 17) | 9.5 |
| C/P | 48 | 48 | 250 → 350 |
| D ($h^{-1}$) | 0.12 | 0.12 | 0.12 |
| Cycle duration (a step b + c) | 1 h | n/a | n/a |
| Decantation duration (a step c) | 4 min 30 sec | 0 | 0 |
| Results | | | |
| Flocculent properties on UW | Excellent | Poor | Poor | n/a = not applicable.

The invention claimed is:

1. A process for producing a microbial cellular biomass having flocculant properties comprising the steps:
   a) introducing into a reactor a substrate comprising at least 30% by weight of monosaccharides to form a reaction medium,
   wherein the reaction medium has a C/N molar ratio of 1 to 9.5, a C/P molar ratio of 40 to less than or equal to 600, and a dilution rate D of 0.05 to less than or equal to 0.35 $h^{-1}$;
   b) stirring the reaction medium obtained in step a) while retaining the C/N molar ratio at a value of 1 to 9.5, the C/P molar ratio at a value of 40 to less than or equal to 600, and the dilution rate D at a value of 0.05 to less than or equal to 0.35 $h^{-1}$;
   wherein the C/N molar ratios of steps a) and b) are identical, and the C/P molar ratios of steps a) and b) are identical; and
   c) eliminating any filamentous bacteria and filamentous fungi by sequential decantation of the reaction medium obtained in step b) to obtain a decanted solid and also the microbial cellular biomass having flocculant properties.

2. The process according to claim 1, further comprising ventilating the reaction medium during the process.

3. The process according to claim 1, carried out in an open-air environment or under forced ventilation.

4. The process according to claim 1, carried out in an open-air environment which is non-sterile.

5. The process according to claim 1, wherein the reaction medium of step a) further comprises microorganisms selected from the group consisting of gammaproteobacteria, flavobacteria, alphaproteobacteria, and betaproteobacteria.

6. The process according to claim 1, prior to step a) further comprising introducing into the reactor a microbial inoculum comprising one or more microorganisms selected from the group consisting of gammaproteobacteria, flavobacteria, alphaproteobacteria and betaproteobacteria.

7. The process according to claim 1, wherein the substrate comprises a hydrolysate and/or monosaccharides.

8. The process according to claim 1, wherein the temperature in the reactor is from 4 to 55° C.

9. The process according to claim 1, wherein the step c) decantation occurs inside the reactor, and the decanted solid is removed from the reactor.

10. A microbial cellular biomass having flocculant properties obtained according to the process of claim 1, wherein the microbial cellular biomass comprises bacterial exopolysaccharides.

11. A process of treating wastewater comprising a step of contacting wastewater with a coagulant and a microbial cellular biomass according to claim 10.

12. The process according to claim 1, wherein the substrate further comprises a microbial inoculum.

13. The process according to claim 1, wherein the monosaccharides are selected from the group comprising hexoses and pentoses.

14. The process according to claim 12, wherein the substrate further comprises nutrients for the microbial inoculum.

15. The process according to claim 1, wherein step c) is done on reaction medium leaving the reactor, the decanted solid being removed and the reaction medium after removal of the decanted solid then being reinjected into the reactor.

16. The microbial cellular biomass having flocculant properties of claim 10, wherein the biomass comprises microorganisms selected from the group consisting of gammaproteobacteria, flavobacteria, alphaproteobacteria, and betaproteobacteria.

17. A method of treating wastewater, the method comprising contacting the wastewater with a coagulant and the microbial cellular biomass having flocculant properties obtained by the process of claim 1.

* * * * *